Oct. 4, 1966

J. L. KILLORAN ETAL 3,277,228

METHOD OF STRETCHING YARN

Original Filed May 25, 1964

INVENTORS
Joseph L. KILLORAN
Claude J. CORMIER

ATTORNEY

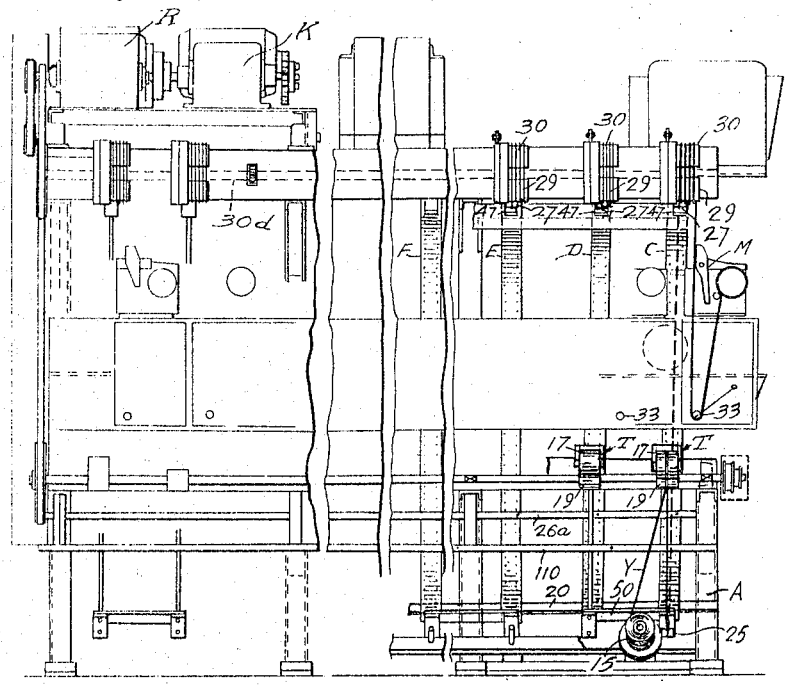
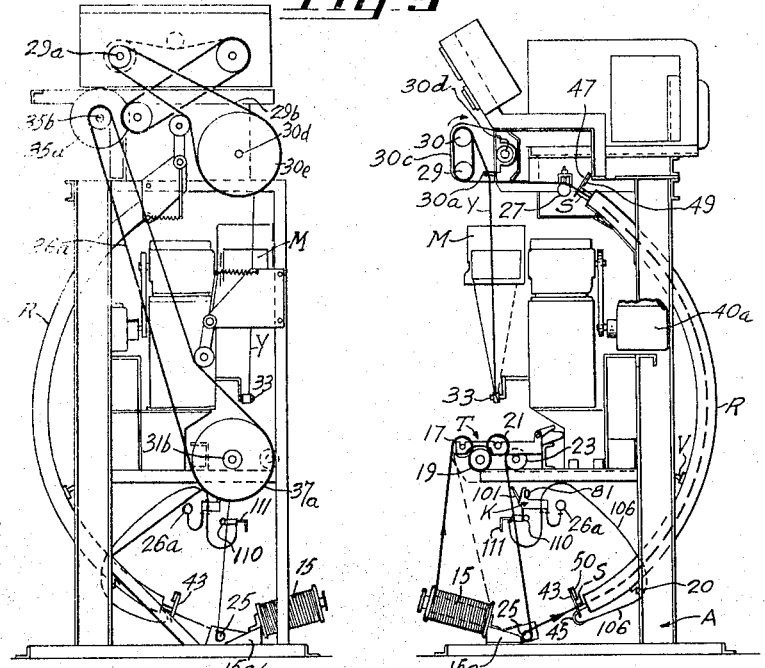
Fig. 3
Fig. 4
Fig. 5
INVENTORS
Joseph L. KILLORAN
Claude J. CORMIER
ATTORNEY

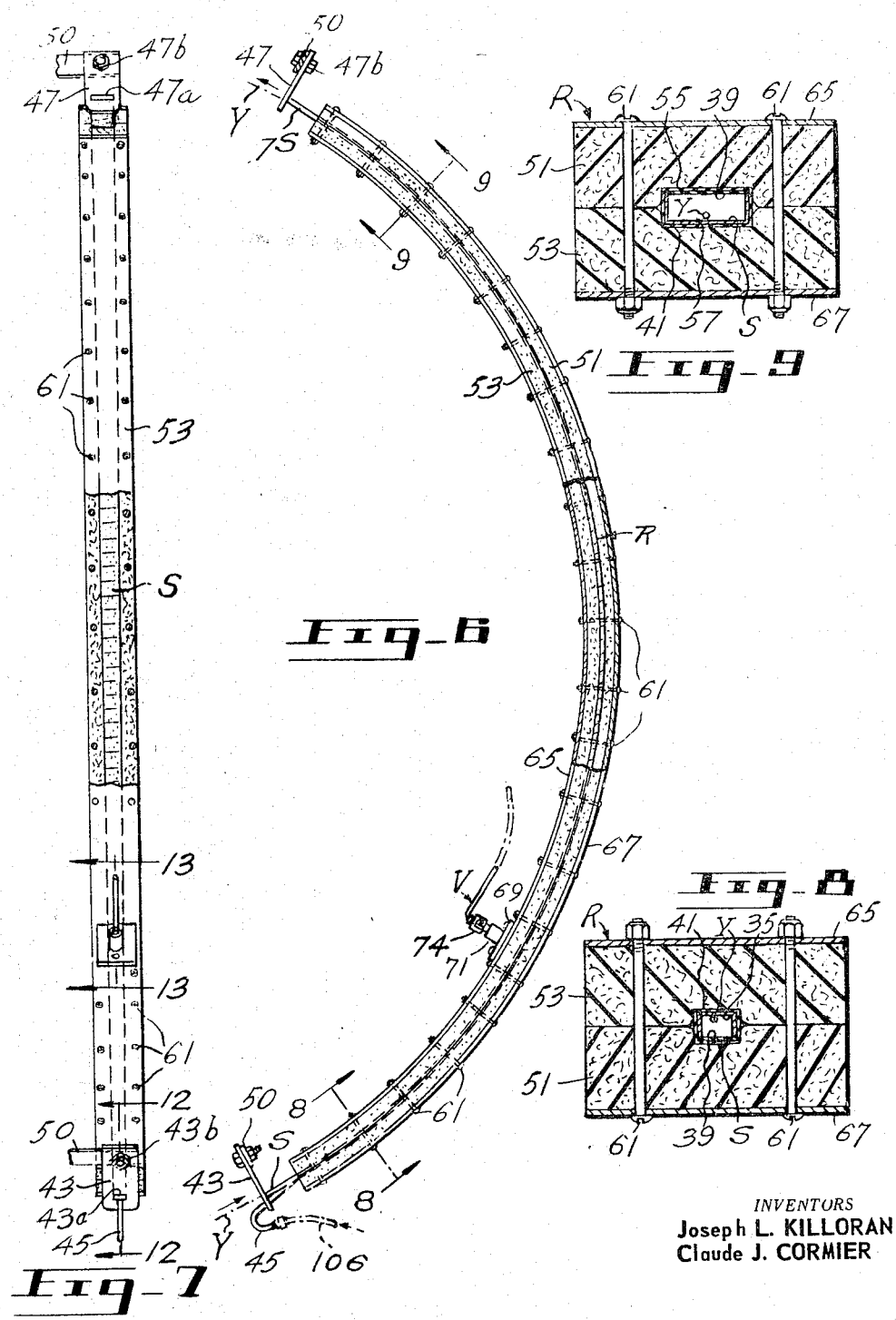

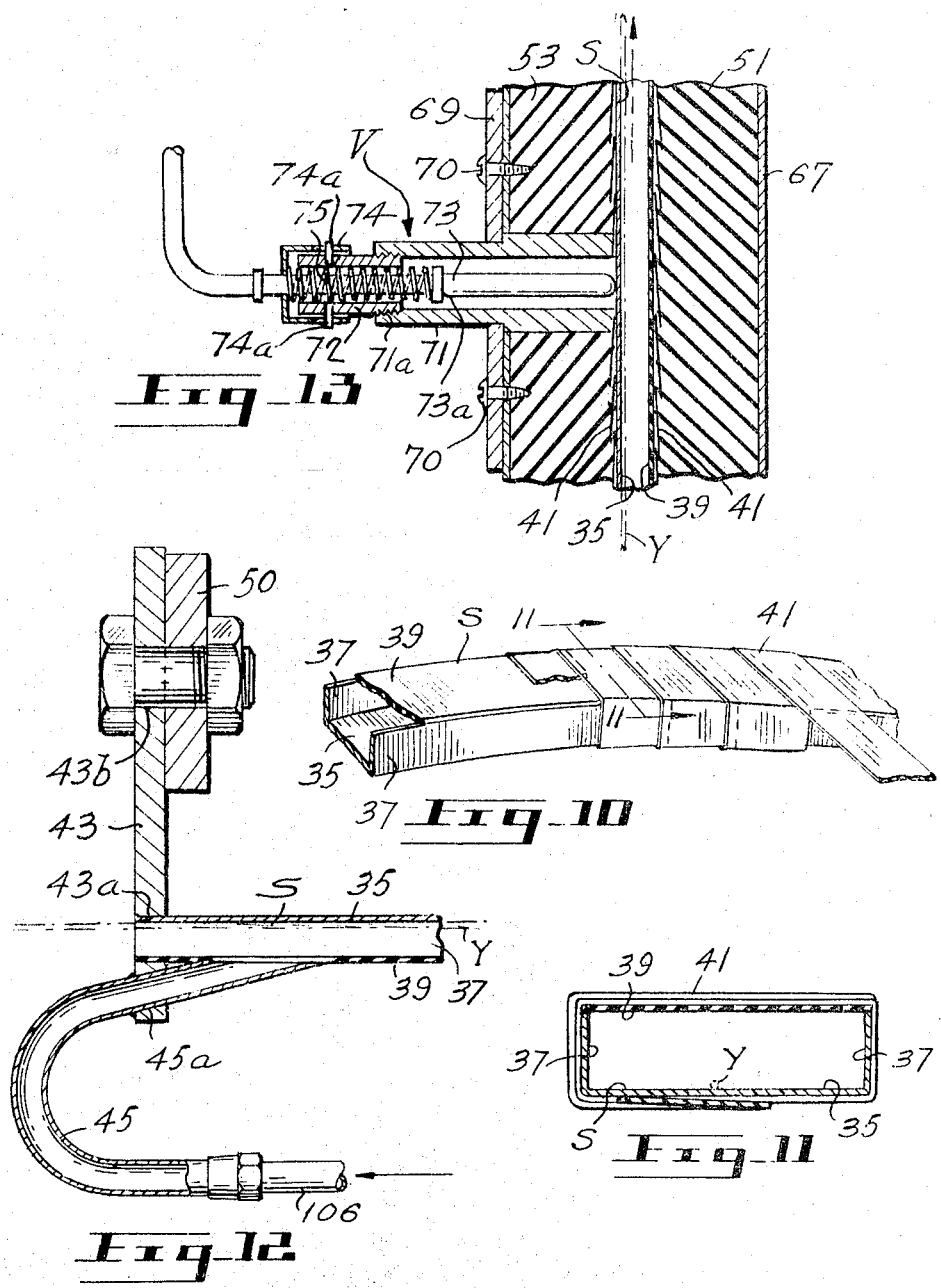

Oct. 4, 1966   J. L. KILLORAN ETAL   3,277,228
METHOD OF STRETCHING YARN
Original Filed May 25, 1964   6 Sheets-Sheet 6
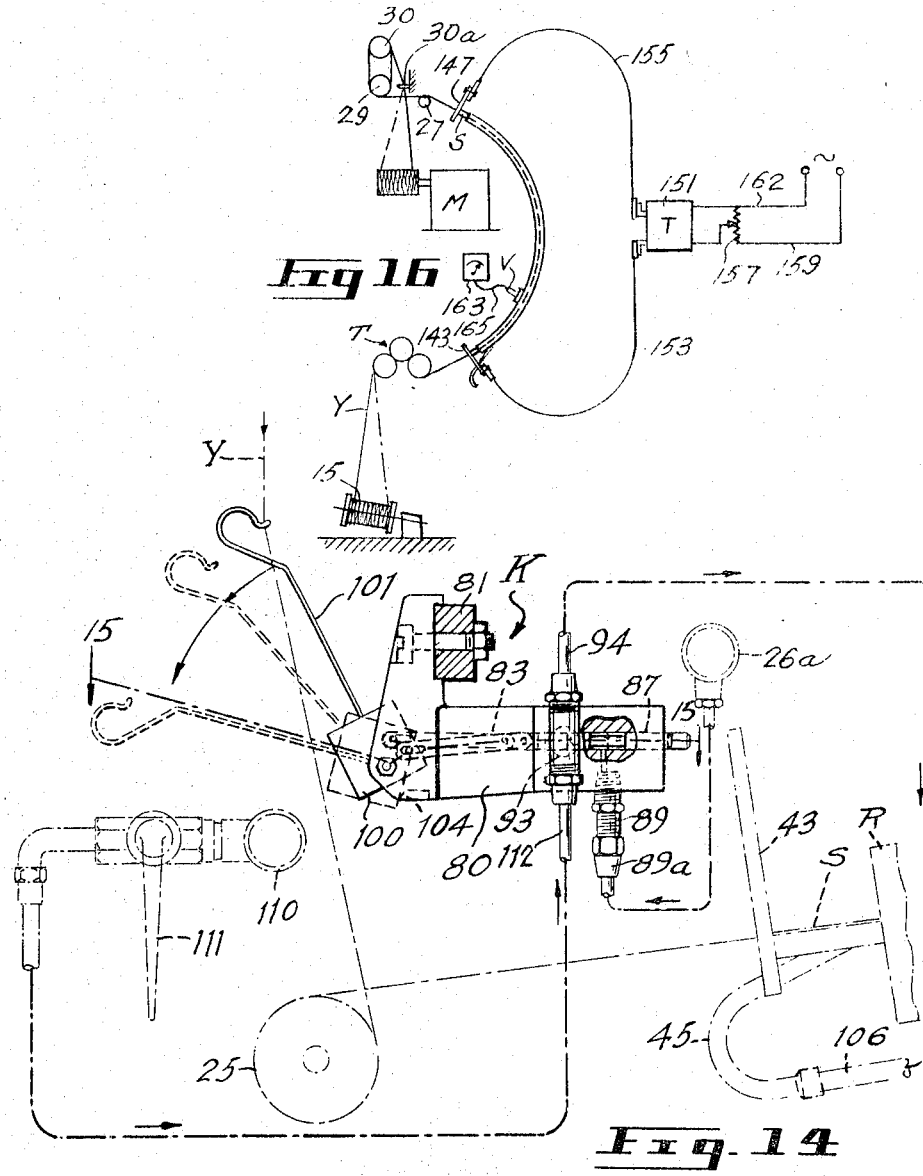
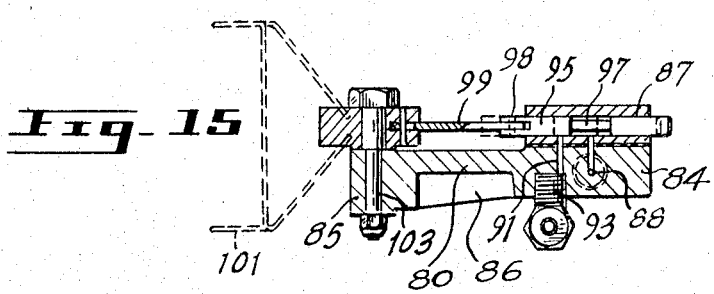
INVENTORS
Joseph L. KILLORAN
Claude J. CORMIER
ATTORNEY 3,277,228
METHOD OF STRETCHING YARN
Joseph L. Killoran, deceased, late of Drummondville, Quebec, Canada, by Irene Agnes Buchanan Killoran, executrix, Drummondville, Quebec, Canada, and Claude J. Cormier, Drummondville, Quebec, Canada, assignors to Chemcell (1963) Limited, Montreal, Quebec, Canada
Original application May 25, 1964, Ser. No. 371,174, now Patent No. 3,238,592, dated Mar. 8, 1966. Divided and this application July 26, 1965, Ser. No. 488,832
6 Claims. (Cl. 264—290)

This application is a division of application Serial No. 371,174, filed May 25, 1964, now U.S. Patent 3,238,592, granted March 8, 1966 and a continuation-in-part of application Serial No. 118,057, filed June 19, 1961, now abandoned.

This invention relates to the heat stretching of yarn made from thermoplastic material.

In the manufacture of filamentary yarns from thermoplastic polymers the stretching operation is an important and difficult step. The physical properties of the filaments as extruded are quite unsuitable for any commercial use because of low tenacity and very high extensibility. In order to develop the strength of the yarns they must be stretched to several times their original length under carefully controlled conditions of speed, temperature and tension. A technique of stretching must be developed for each different polymer and the apparatus used must be adjustable to take advantage of different properties of the same polymer, that is, according to its inherent viscosity, method of extrusion, pigmentation, etc.

Techniques for drawing thermoplastic filaments to increase their properties for textile uses are well known. Equipment for stretching filaments of linear and other thermoplastic polymers at room temperature or elevated temperatures are currently in commercial use in many countries. The most common commercial type known as a draw stretcher or draw twister consists of a multiplicity of electrically heated skewed advancing rolls operating in pairs, two pairs for each end of yarn. The yarn is heated while advancing on the first pair of rolls and stretched while passing from the first pair to the second pair whose rolls rotate at a higher speed. The distance between the first pair and the second pair of rolls may vary from 8" to 16" or more. The second pair of advancing rolls are also heated to control the shrinkage of the yarn after stretching.

The machine has serious disadvantages, among which are the following. It is very expensive in first cost and in upkeep because of the complicated electrical equipment required to heat a large number of rotating rolls. It is difficult to measure or control the temperature of the rotating rolls and because of this it is almost impossible to maintain uniform temperature over a large number of rolls necessary for a production machine. When an end breaks down the temperature of the roll overshoots and fuses the yarn when attempting to rethread. The yarn passing from the first pair of heated rolls passes through the open air on its way to the second pair of rolls becoming partially cooled at the moment it is being stretched. This degrades the yarn because of phenomena known as "cold stretch" which causes a "chalky" appearance and changes the shade of pigmented yarns. This type of stretching machine cannot be used for stretching untwisted multifil yarns because on the first pair of advancing rolls (before stretching) the parallel filaments overlap and break.

Many attempts are being made to overcome the difficulties encountered with the draw stretcher such as individual automatic temperature controls, auxiliary heaters between the rolls, etc., but these further increase the cost and complication of the machine and do not fully solve the problem.

Another type of machine in commercial use consists of two sets of large steam heated advancing rolls, stretching between them a large number of yarns in sheet form. This equipment is less costly than the draw stretcher and overcomes the difficulty of maintaining uniform temperature, but introduces another serious disadvantage, in that a broken end cannot be re-threaded.

It is an object of this invention to provide a machine for the stretching of thermoplastic fibers, particularly polyolefins, which will overcome the difficulties mentioned above and which will have positive advantages among which are the following. It can be used for continuous stretching in tandem with an extrusion machine, stretching any desired number of parallel (untwisted filaments) in each heating element. Broken ends can be rethreaded without interfering with others. When stretching from package to package a number of fine filament yarns may be run in parallel through each heating element and wound together on the same package, or, if desired, additional winding heads may be provided to separate and take up each yarn separately. It overcomes the problem of "cold-stretch" and chalkiness in unpigmented yarns and, when properly adjusted, can be used for stretching pigmented yarns without encountering differences in shade due to "cold-stretch." Speeds and temperatures can be varied as required. The construction is simple and easily maintained. The stretching takes place inside the tube in contact with the heated metal which provides accurate temperature control of the filaments at the moment of stretching. It is cheap to construct and simple to operate. There is no need for ovens or other heated enclosures which introduce operating difficulties because when stretching a multiplicity of yarns they must be opened and reopened at frequent intervals to repair broken ends, thus degrading all the other ends.

Having thus generally described the invention, it will now be referred to in more detail by reference to the accompanying drawings showing preferred embodiments, and in which FIGURE 1 is a perspective front view of the machine showing a plurality of stretching units according to the invention.

FIGURE 3 is a front elevation of the apparatus shown in FIGURE 1.

FIGURE 4 is a side elevation of the apparatus shown in FIGURES 2 and 3 illustrating particularly the drive mechanism.

FIGURE 5 is a side elevation partly in section showing one of the stretching units and the course of the yarn from feed to take up.

FIGURE 6 is a vertical cross-section through one of the heating tubes according to the invention.

FIGURE 7 is a front elevation partly in section of the tube shown in FIGURE 6.

FIGURE 8 is a transverse cross-section along the line 8—8 of FIGURE 6.

FIGURE 9 is a transverse cross-section along the line 9—9 of FIGURE 6.

FIGURE 10 is a fragmentary perspective view on a large scale of the heating tube partly assembled showing particularly its various parts.

FIGURE 11 is a transverse cross-section on a still larger scale along the line 11—11 of FIGURE 10.

FIGURE 12 is a greatly enlarged cross-section along the line 12—12 of FIGURE 7.

FIGURE 13 is a greatly enlarged cross-section along the line 13—13 of FIGURE 7.

FIGURE 14 is a side elevation on an enlarged scale of the automatic cooling and piling up mechanism.

FIGURE 15 is a horizontal cross-section partly in elevation along the line 15—15 of FIGURE 14.

FIGURE 16 is a diagrammatic view showing particularly the electrical circuit for supplying current to the heating unit.

Figure 1:
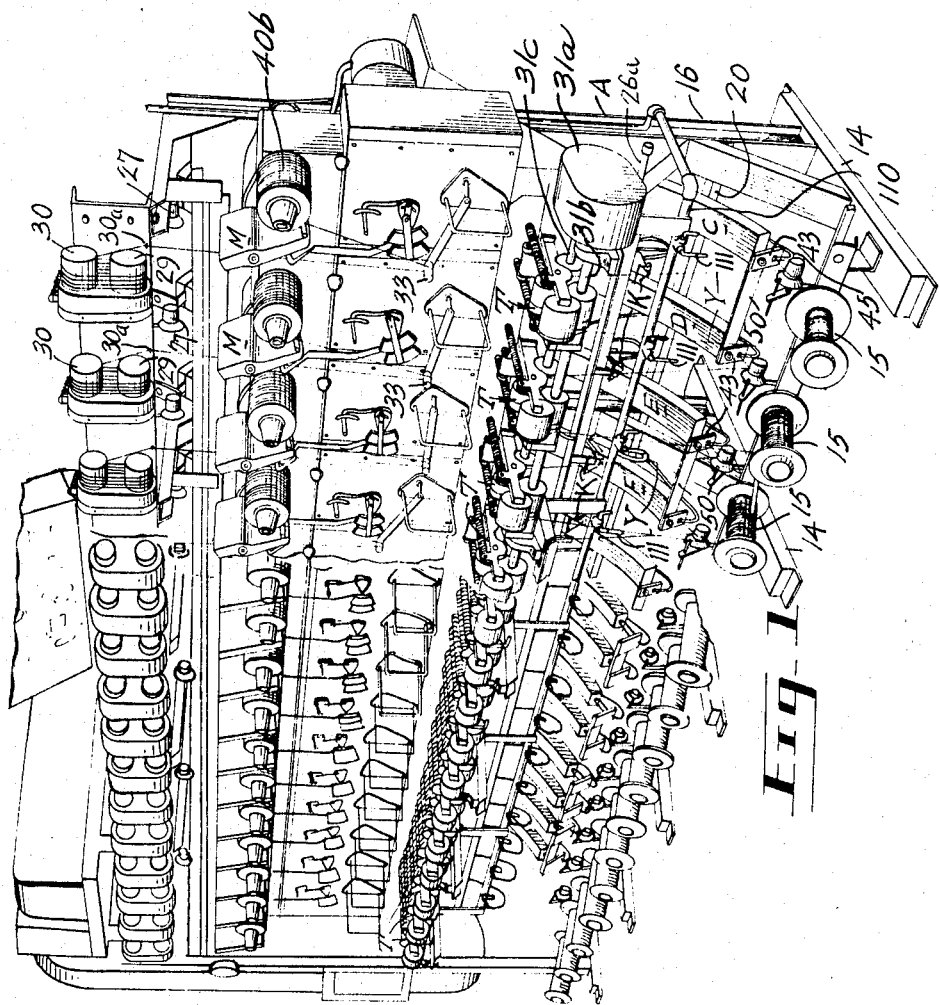
Figure 2:
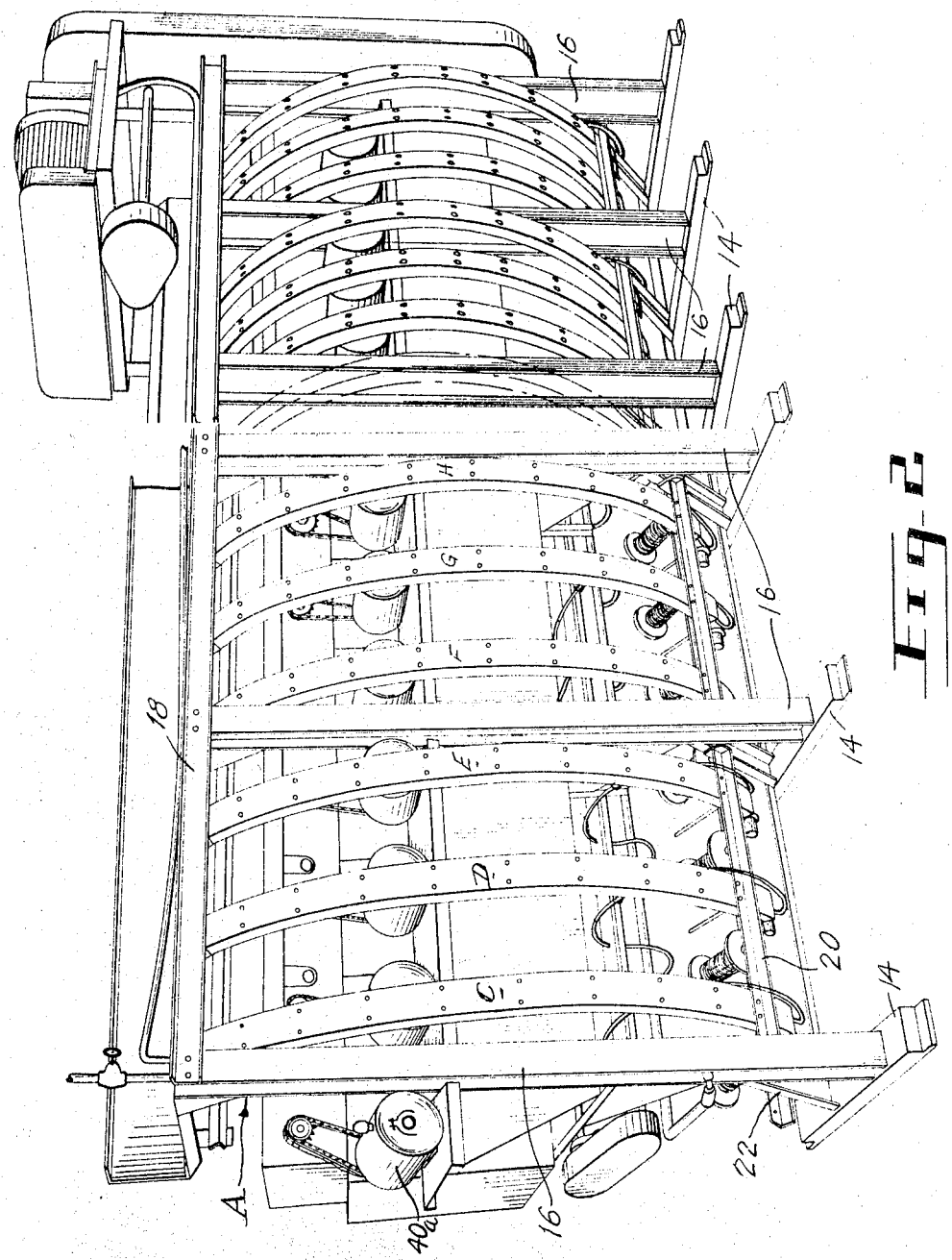
FIGURE 2 is a rear elevation of a stretching apparatus according to the invention which embodies a plurality of stretching units mounted side by side on the main frame.

Referring more particularly to the drawings, an elongated main frame A includes as main structural members feet 14 carrying uprights 16 in the form of H beams across the top of which is a cross bar channel member 18 and which carries a plurality of stretching units C, D, E, etc. mounted at the bottom on cross bar angle members 20 which are carried by diagonal bracket-channels 22 each of which extends between foot 14 and its upright 16. Each of these stretching units is identical and adapted to process a single yarn or several yarns in parallel in accordance with the invention. The apparatus will be described by reference to the movement of the yarn as best shown in FIGURE 5. The yarn Y passes from a package 15 which may be a bobbin or cone suitably mounted for rotation on a bracket 15a on the frame A, or can be yarn coming continuously from a spinning machine or other yarn producer. The yarn passes through a draw off device T which in the particular embodiment shown includes four nip rolls 17, 19, 21 and 23. The rolls 19 and 23 are driven rolls, which are each driven from a common shaft extending the length of the frame A. The rolls 17 and 21 are resting on the driven rolls "floating."

From the nip rolls the yarn Y goes down and about a snubbing device 25 adjacent to the entrance of a curved stretching tube R. From the snubbing device 25 the yarn meets, at a tangent, the surface of the tube R (about which more will be said later) and passes through the tube R and from its surface tangentially to a guide roller 27 thence to stretch rolls 29 and 30 at the top of the machine.

After leaving the draw off device T the yarn passes an automatic cooling device K (described below). This device is arranged so that if the yarn breaks, a drop wire, normally supported by the yarn falls by gravity to open a pneumatic cylinder valve and to apply cooling air to the inlet of the tube R. This air is supplied from a header 26a running the length of the machine. The header 26a, in turn, is supplied by an adjustable pressure control device so that the exact amount of cooling air required for any given rate of heating may be predetermined and set in advance. A manual valve at each stretching point (see FIGURE 1) supplies air at higher pressure from a separate header into the same nozzle for threading-up purposes.

The stretch rolls 29 and 30 operate according to the "skewed advancing principle" at speeds up to about ten times faster than the tensioning rolls T. Both the draw off rolls T and the stretch rolls 29 and 30 are known in the textile industry. But, the combination of both with the special stretching tube R according to the invention has a particular advantage since the nip rolls can function without tension on the yarn at the inlet and are suitable for threading up at slow speed but not at high speed. The skewed advancing rolls 29 and 30 cannot function without maintaining the yarn under tension but are suitable for threading-up at high speeds. The inlet tension is present, of course, due to the stretching. The outlet tension is supplied by the winding machine M to which the stretched yarn proceeds via a tension control arm having at its end a tapered roll 33 (conventional constant tension winding machine).

In brief, then, the yarn Y passes from the supply bobbin 15 to over the draw off device T, through the pneumatic drop wire device K, over the snubber 25, through the heated stretching tube R, over the guide roller 27, about the stretch rolls 29 and 30, and thence to the winder M, through a guide 30.

*Drive*

The drive of the stretching apparatus is taken from an electric motor K and reduction gear unit R. A shaft 31b extends the length of the apparatus and drives the rolls 19 and 23. The shaft 31b is driven through a pulley 37 from a belt 36a which travels about a pulley on a shaft 35b which is in turn driven by belting from the reduction unit R. Likewise, a shaft 30d which extends the length of the machine at the top drives the rolls 30 and 30a. The shaft 30d is driven from a pulley 30e connected by a belt 29b with a pulley 29a driven by the reduction unit R. Separate motors 40a drive the winding mechanism M including the bobbins 40b on which the yarn is eventually taken up.

*Heat and stretching element*

An important feature of the present invention is the heating element R. In one preferred form of the invention the element R is made up of an elongated bowed trough or channel member S, formed from a single sheet of electrically conductive metal of the shape shown in FIGURES 6 to 11. The trough S has a convexly curved floor 35 which preferably increases regularly in width from the receiving end to the exit end and at each side by an upstanding integral flange or wall 37, which is of the same height throughout the length of the channel member S. Permissible variations in the characteristics of the tube, as for example length, curvature, thickness, etc. will be discussed later.

On the top of the tube there is placed a glass fabric base laminate insulating strip 39 which lies on the top of the walls 37 and bridges the trough. The trough with the strip 39 in place is tightly wound with glass fiber tape 41 so as to form a four-sided tube of which the floor 35 and walls 37 constitute three sides and the strip 39 the other side.

The inlet end of the tube is provided with a copper terminal member 43 having an opening 43a receiving the end of the tube and a connecting opening 43b. A threading nozzle in the form of a J-shaped tube 45 extends through a diagonal opening 45a in the terminal member 43 and enters the bottom of the trough S at an angle as shown. The outlet end of the trough S is also provided with a copper terminal 47 having an opening 47a receiving the end of the trough S and a connecting opening 47b. The connection between the metal part of the tube R and the terminals 43 and 47 can be by welding, brazing, or any other suitable method. This also applies to the connection between the tube 45 and the plate 43.

The trough S is encased with insulation as follows. Elongated coated juxtaposed fibreglass blocks 51 and 53 are each provided with grooves 55 and 57 respectively which form between them a channel receiving the tube including the trough S, and its covering. The outer face of the block 51 is clad with an aluminum facing sheet 65 and the block 53 is provided with an aluminum facing sheet 67. The blocks 51 and 53 are clamped together by non-magnetic screws 61 which extend through them and their cladding 65 and 67 periodically along the length of the heating element R.

A thermocouple device V is connected to and extends through openings in the facing sheet 65 and the block 53. This thermocouple has a base 69 which is held by screws 70 to the sheeting 65 and its underlying block 53. A sleeve 71 has a part which extends through openings in the base 69, sheet 65 and block 53 to a point adjacent the outer surface of the trough S. The sleeve 71 also has a part projecting outside the block 53. The outer end of the sleeve 71 is internally threaded as at 71a to receive the threaded end of a nipple 72 carrying at its outer end a bayonet cap 74 held to it by a screw 74a. A thermocouple bulb 73 is positioned in the sleeve 71 with an extension passing back through the cap 74. A coil spring 75 is mounted on the extension of the bulb 73 and acts between a shoulder 73a on the bulb and the cap 74 to urge the inner end of the bulb 73 against the wall of the trough S. The extension of the bulb 73 leads to an instrument (not shown) where a reading may be taken of the temperature sensed by the bulb 73.

*Automatic cooling device*

The automatic cooling device K is best shown in FIGURES 14 and 15. This device includes a body 80 which is mounted on a beam 81 which extends along the length of the machine and also carries the similar stop motions for the other tubes R. The body 80 is of the cross-sectional shape shown in FIGURE 15 and has a widened head 84 projecting to one side and a widened foot 85 extending to the other side and separated therefrom by a neck 86. The head 84 is provided with a bore 87 extending through it from back to front and an inlet passage 88 leading from a nipple 89 connected to an air inlet pipe 89a. An outlet passage 91 extends from the bore 87 to a T 93 connected to an air pipe 94 leading to the cooling air connection 45. A piston 95 is operably mounted in the bore 87. The piston has an intermediate narrow part 97. The front of the piston is pivotally connected by a pin 98 through a slot 99 in a link 99 which in turn is pivotally connected to a block 100 mounting a drop wire 101. The block 100 is pivotally mounted on a bolt 103 extending through the opening in the part 85. A stop bracket 104 is mounted on the neck 86.

In operation, the drop wire 101 is in the upper position shown in dotted lines and is held in that position by the yarn under tension running from the draw-off rools T to the snubber 25. In this position, the front thick part of the piston 95 blocks the outlet opening 91 and thus cuts off its supply of air from the inlet opening 88. When the yarn breaks the wire 101 is no longer supported and falls into the position shown in full lines in FIGURES 14 and 15. The fall is slow at first because the wire 101 is nearly vertical. The slot 99a has been provided in the link 99 which acts as an elongated pivot hole thus allowing the wire 101 to fall freely through the first half of its travel, which develops sufficient momentum to start the movement of the piston 94. The movement is completed during the second half of the travel. The fall of the wire 101 pulls the piston 94 forward and clears the exit passage 91 thus allowing the air to pass through it from the passage 88. The air is immediately blown through the J connection 45 and into the tube R. This air serves to prevent the tube R from overheating when the yarn breaks.

The apparatus is also provide with means for piecing up the yarn if it breaks. This includes a compressed air pipe 110, which extends the length of the machine and is provided at intervals with manual valves 111, one valve corresponding to each stretching unit C, D, E, F, etc. Each valve 111 is connected by a pipe 112 to the T 93 of the particular stretching unit to which it corresponds. Through the T 93 the pipe 112 is connected with the pipe 106 and thus with the J-connection 45. By opening the valve 111 compressed air is applied immediately to the J-connection 45 and through the trough S. The end to be fed is introduced into the end of the trough S carrying the stream of air, thus created, and is blown by it through the trough S from inlet to outlet. Once the new end of yarn is passed through the tube and onto the take-up rollers 29 and 30, the drop wire 101 is reset by the operator into its normal upper position shown in dotted lines in FIGURE 14 and the heating-stretching operation is continued as previously described until there is another break.

Electric current is supplied through a transformer 151 by a wire 153 through the terminal header 43 and connected by a wire 155 through the terminal header 149. The transformer is of suitable size adapted to provide a power supply of a suitable voltage and suitable amperage for heating the trough S to the desired temperature or a multiplicity of troughs in series or series parallel. The temperature may be controlled manually by means of a variable voltage device 157. A thermocouple type of temperature-indicating instrument 163 may be connected to the thermocouple V by wire 165 so as to indicate the temperature of the trough S. The instrument 163 may be connected into the electrical system so as automatically to regulate the temperature, if desired.

As shown, a number of heating elements R are shown provided in the same frame. They may be connected in series on a single transformer.

*Heating and stretching unit—Details*

The characteristics of the heating device R may vary somewhat. The trough S is made preferably from stainless steel sheet in the annealed state, or Chromel sheet, or Nichrome, bent into trough shape. According to a preferred construction, it is polished to a "mirror" finish on the inside or yarn guiding face then vapor blasted to a so-called "satin" finish. This finish preferably consists of irregularities approximately 5 microns deep on the average, spaced in the range of 10 to 20 microns from peak to valley in all directions. After vapour blasting, the surface is provided with chromium plate, for example about 0.002" thick. The irregularities may range from about 3 microns to about 8 microns in depth and may be spaced within the range of about 10 to 50 microns (from center to center). Where the surface of the trough S has been treated to reduce friction, as described, the curvature of the trough S is not critical.

Such a surface may be prepared by first polishing the metal surface to a mirror-like finish. Then blasting with a fine abrasive powder carried in a stream of air and water vapor at high velocity. This provides the surface with a multitude of microscopic indentations. The thus prepared surface is then chromium-plated. The resulting chromium-plated surface reduces the frictional resistance of the surface to the yarn substantially to a minimum and prevents wear. For a surface of this nature, the curvature is not critical, whereas, without such a friction-free surface, it is desirable that the curvature of the surface be such that it is relatively less curved at the inlet end to reduce the friction and it is more curved towards the outlet end, so as to provide a certain amount of friction. Thus, at the inlet end, the yarn is not subjected to any substantial friction, and thus is not stretched before it is sufficiently softened, while the yarn towards the outlet end is softened and is then subjected to friction and stretched. With the chromium-plated surface as described, the resistance offered to the yarn is at a minimum and consequently, the curvature being much less critical, the stretching trough may be curved to suit the machine and to provide a convenient location at the inlet and outlet for ease of operation, to draw the yarn from all the units.

It is rather made to suit the machine, with the length about as long as practical without exceeding the maximum reach of the average operator. Shorter lengths can be used but the speed of stretching would have to be reduced accordingly. If the length of the tube is increased, maintaining the same radius, the machine would have to be higher. If the radius is decreased maintaining the same length, the tube would project further out the back and occupy more floor space.

The radius of the trough S may vary from inlet to outlet with the maximum radius at the inlet and the minimum radius at the outlet. The surface may take a single curve or a series of curves of varying radii. The greater the curvature, the greater the tension on the yarn. The ideal curvature maintains contact of the surface with the yarn but is insufficient to cause drag or high friction. Preferably, the radius of the curvature of the trough S should remain within about 24" and about 40" and may vary in curvature along the length with the short radius preferably at the outlet end. A practical length is between about 4' and 8', it being understood that when the tube is shorter, the stretching speed would be reduced.

A preferred overall length for yarn up to ten thousand denier is about 6 feet from terminal to terminal, bent into an arc comprising 128½° of a circle. This shape of tube provides suitable pressure of the yarn against the running surface and the length is sufficient for ordinary rates of stretching. A typical trough-shaped heating element having a length of 72 inches would have a radius of curvature of about 34½ inches through the first 68½° of its curvature and then a radius of curvature of about 30 inches for the last 60° of its curvature with a transition between these two radii of curvature in between.

Theoretically, the thickness of the metal wall of the trough can vary considerably. The thicker the wall, for example, more amperage would be required and in theory, the tube could be as thin as about $\frac{1}{64}''$ but it would not be self-supporting. The applicant prefers that the metal wall of the trough be in the neighborhood of $\frac{1}{16}''$, when constructed as shown.

A preferred metal for the manufacture of the trough S is an alloy of nickel and chrome, available on the market under the trademarks "Chromel" and "Nichrome." These metals are ideal since they have high electrical resistance, sufficient heat conductivity and are free from oxidation when operated at high temperatures. Most of the chrome-nickel stainless steel alloys although of lower electrical resistance, are also suitable and are readily available for tube forming. The amperage used for heating must be adjusted in accordance with the resistivity of the metal used and the thickness of the wall. All tubes, whether connected in series or in parallel, or in a combination of both, must be calibrated to have identical resistance.

The amperage used for heating must be adjusted to the type of yarn being stretched and also according to the amount of volatile matter, lubricants, etc., which may be on the yarn entering the tube. The temperature of the trough must be adjusted to heat the yarn to its softening point. The exact temperature will vary with different types of yarn. For polypropylene, for example, the temperature should be within the range from about 115° C. to about 155° C. measured at the surface of the floor 35. While the preferred heating surface has been described as the convex floor of a trough S made from a strip of metal, it should be understood that the principle of the invention can also be employed using heating surfaces having other cross-sectional shapes, for example, cylindrical, D-shaped, etc. The surface of the conformation described, however, has decided advantages and it is therefore greatly preferred.

Several tubes may be used in series with a pulley between them to obtain longer residence time, higher speeds and higher stretch ratios. The tubes are normally connected in series electrically but can be connected in parallel or in any series-parallel combination. In all cases, they must be calibrated so that their respective electrical resistances are identical.

The tape with which the trough S is wrapped may be plain woven glass fabric completely dry with no adhesive and coated with shellac, phenol resin, or other suitable adhesive.

A wide range of both monofilament and multifilament yarn from about 40 denier to about 10,000 denier (measured after stretching) may be processed by the invention. This is one of the major advantages, i.e. versatility, which cannot be found in other types. There may be 25 to 100 or more filaments in one yarn and several yarns may pass through the same heating tube at the same time and be wound together on a single package.

The ratio of input speed to output speed may vary widely for different types of yarn. For example, polypropylene monofil has been stretched at an input speed of four feet per minute, and an output speed of eighty feet per minute, that is, 20 to 1. Light denier monofil polypropylene has been stretched 3 to 1 using an input speed of two hundred feet per minute and an output speed of six hundrd feet per minute. These examples show the wide range of permissable speeds and stretch ratios. A typical speed for heavy multi-filament polypropylene (rope yarn) would be an input speed of forty to sixty feet per minute and an output speed of up to 4 times the input speed, or an input speed of thirty feet per minute and a stretch ratio of 5 to 1. A typical rope yarn would be 5,000 denier 400 fils after stretching.

Typical results in terms of yarn treatment, for example, are for rope yarn before stretching, 20,000 denier, forty feet per minute, tube temperature 150° C., stretch ratio 4 to 1, speed after stretching 160 feet per minute, 5,000 denier, 400 fils. For light denier multifilament, speed two hundred feet per minute, six hundred denier, temperature of tube 145° C., ratio of stretching 3 to 1, output 200 denier at six hundred feet per minute, 100 fils.

Most yarns are treated before stretching with a "lubricant" which is often an emulsion of oil in water. The moisture from this lubricant must be evaporated before reaching the temperature of 145° C., therefore, there must be sufficient residence time in the tube at any given speed to permit the evaporation of the moisture and the heating of the filaments to the stretching temperature.

When stretching yarns directly from a continuous source such as an extrusion machine, the process demands that lubricant be applied immediately after extrusion, that is, before the yarn contacts any guides. Therefore, means must be provided for evaporating the volatile portion of the lubricant before the yarn can be heated to stretching temperature. The curved trough S is particularly adaptable for this purpose, because it can be designed with sufficient length to provide the necessary residence time to first of all evaporate the volatiles then to heat the filaments to the desired temperature, and finally to allow the time required for the actual stretching which occurs after the filaments are heated to the softening point.

The gradual increase in cross-sectional area of the trough S due to the taper provides highest density of the heating current and consequently highest heat release at the inlet end to provide for preheating and evaporation of the volatiles in the lubricant. The heat release gradually reduces to a minimum at the outlet end, thus avoiding overheating after stretching temperature has been reached.

According to the method of the invention some types of thermoplastic fibers may be stretched as much as twelve times in their extruded length. The following is an example showing the improvement in physical properties obtained when stretching polypropylene fibers in the ratio of 10:1.

| | Before Stretching | After Stretching |
|---|---|---|
| Denier | 5,000 | 500 |
| No. of filaments | 50 | 50 |
| Tenacity, g.p.d.[1] | 0.6 | 9.3 |
| Elongation, percent | 900 | 16 |
| Speed, f.p.m | 30 | 300 |

[1] G.p.d.=grams per denier.

The apparatus of the invention may be adjusted for different stretch ratios ranging from 3:1 to 12:1 and for different speeds, different temperatures, making it suitable for a wide range of different polymers.

The tension in yarn as it leaves the final heating zone is determined by the force required for stretching at the optimum stretching temperature. The tension in the yarn as it enters the heating element equals the stretching tension minus the force required to overcome the friction caused by the yarn sliding on the surface. The curvature and length and temperature of the tube is designed so that the tension on the yarn does not increase to the stretching tension until the yarn has been heated to optimum stretching temperature. Stretching at too low a temperature results in chalky appearance, broken filaments, and generally degraded yarn. A temperature that is too high also causes generally degraded yarn because of fused filaments and stiffness. The optimum temperature varies in relation to the denier per filament stretch ratio, speed and the viscosity of the parent polymer, but generally it is in the range of about 100° C. to about 135° C.

We claim:

1. A method of stretching yarn by passing it over an elongated curved heating surface which comprises passing said yarn onto an inlet end of said surface and taking it off an outlet end at a higher speed of at least three and one half times the speed at which it is passed onto the surface, subjecting the yarn to a gradually decreasing rate of heat application from the inlet end to the outlet end, whereby the yarn is heated to the stretching temperature and is subjected to stretching tension after having been heated to the softening point thereof.

2. A method as defined in claim 1 in which the speed at which the yarn is taken up is from about 3.5 to about 10 times the speed at which is is fed.

3. A method as defined in claim 1 wherein the curvature of said surface is between approximately 24 and 40 inches.

4. A method as defined in claim 1 wherein the length of said surface is between approximately 4 feet and 8 feet.

5. A method of stretching yarn, comprising feeding yarn continuously into the inlet end of a heating zone under tension at a constant speed and taking up the yarn at the outlet end of said zone at a constant speed greater than the feeding speed, heating said yarn in said zone by contact with an elongated curved heated surface, offering differential frictional resistance to said yarn along its length, coordinating the feeding and take-up speed with the frictional resistance of the surface and the temperature, whereby the tension on the yarn is maintained below the stretching tension until the yarn has been heated substantially to optimum stretching temperature.

6. A method of stretching yarn, comprising feeding the yarn continuously into the inlet end of a heating zone at a constant speed and withdrawing it from the outlet end of the zone at a constant speed of at least three times the feeding speed, causing said yarn in said zone to follow a convexly curved low friction heating surface for a distance of at least four feet with the heating surface temperature decreasing from the inlet end to the outlet end whereby the yarn is subjected to a greater initial temperature at the inlet end than at the outlet end, and said surface having a curvature effective to retain the yarn in constant contact therewith throughout its length whereby the yarn is softened and stretched.

References Cited by the Examiner

UNITED STATES PATENTS

| | | | |
|---|---|---|---|
| 2,444,064 | 6/1948 | Philipp | 28—59.5 X |
| 2,807,863 | 10/1957 | Schenker | 28—72 |
| 2,891,375 | 6/1959 | Vandamme et al. | 28—62 X |
| 2,958,921 | 11/1960 | Gilchrist et al. | 28—71.3 X |
| 3,071,838 | 1/1963 | Scragg | 28—62 |

MERVIN STEIN, *Primary Examiner.*

DONALD W. PARKER, *Examiner.*

L. K. RIMRODT, *Assistant Examiner.*